United States Patent [19]

Kim

[11] Patent Number: 5,195,327

[45] Date of Patent: Mar. 23, 1993

[54] COMPRESSOR DRIVE CONTROL METHOD FOR COOLING AND HEATING DUAL-PURPOSE AIR CONDITIONER

[75] Inventor: Tae-Duk Kim, Suwon, Rep. of Korea

[73] Assignee: Samsung Electronics Co., Ltd., Suwon, Rep. of Korea

[21] Appl. No.: 837,888

[22] Filed: Feb. 20, 1992

[30] Foreign Application Priority Data

Feb. 26, 1991 [KR] Rep. of Korea .................. 91-3134

[51] Int. Cl.$^5$ ............................................. F25B 43/02
[52] U.S. Cl. ................................. 62/84; 62/193; 62/158; 62/472
[58] Field of Search .................. 62/192, 193, 84, 468, 62/469, 470, 471, 472, 158

[56] References Cited

U.S. PATENT DOCUMENTS

| | | | |
|---|---|---|---|
| 3,133,429 | 5/1964 | Griffin | 62/193 X |
| 3,640,085 | 2/1972 | Harris | 62/158 |
| 4,066,869 | 1/1978 | Apaloo et al. | 62/84 X |
| 4,444,017 | 4/1984 | Briccetti et al. | 62/84 |

*Primary Examiner*—Harry B. Tanner
*Attorney, Agent, or Firm*—Burns, Doane, Swecker & Mathis

[57] ABSTRACT

The present invention relates to the cooling and heating dual-purpose air conditioner, and more particularly to the heat pump type cooling and heating dual-purpose air conditioner wherein the stand-by control is performed in order to prevent the viscosity increases caused by the lubricating oil freeze in the compressor occurring at the initial cooling operation stage and therefore the smooth drive of a compressor in an air conditioner is performed by the preventing of the lubricating oil freeze.

4 Claims, 3 Drawing Sheets

COMPRESSOR DRIVE CONTROL METHOD FOR COOLING AND HEATING DUAL-PURPOSE AIR CONDITIONER

FIELD OF THE INVENTION

The present invention relates to a cooling and heating dual-purpose air conditioner and, more particularly, to an air conditioner with a heat pump type cooling and heating dual-purpose air conditioner wherein smooth drive of a compressor can be achieved by preventing freezing or an increase in the viscosity of the lubricating oil in the compressor, which occurs at the initial operating stage of the cooling.

DESCRIPTION OF THE PRIOR ART

In the conventional air conditioner, the initial operation of a compressor is done under the condition of lubricating oil being injected into the compressor for smooth rotation of rotor inside the compressor. However if there is no lubricating oil or less lubricating oil than the required quantity inside the compressor, the chances are that problems can easily occur due to mechanical abrasion.

Furthermore, if the inner temperature of the compressor decreases below a particular temperature(i.e. around 0° C.), the viscosity of the lubricating oil in a compressor increases, causing complete separation from the refrigerant and making the normal lubricating function of preventing mechanical friction next to impossible. Therefore because a compressor exposed to a particular low temperature for a long time requires rapid initial current during initial start-up along with the initial torque drive having to be increased due an inadequate supply of lubricating oil, there can be a possibility that the control circuit of the compressor or the compressor itself gets broken and burnt down.

The conventional method of preventing this kind of lubricating oil freeze or viscosity increase at the initial drive of compressor was to preserve the heat during the on-going operation by wrapping up the compressor with heat accumulating material or attaching a heater for pre-heating before the operation begins.

However in the former case of using heat accumulating material, the viscosity of lubricating oil increases due to a drop in temperature inside the compressor below a certain level if it is not used for a long time. In the latter case of attaching a heater, separate expenses of installing a heater are required. Additionally, the drawback of generating additional consumption of electric power for the heater drive arises.

SUMMARY OF THE INVENTION

It is, therefore, an object of the present invention to provide a cooling and heating dual-purpose air conditioner with a compressor drive control method which constantly enables the smooth initial drive of the compressor by making the lubricating oil mix adequately with refrigerant through sufficient forced increases of the compressor inner temperature by controlling the input current of the compressor when the compressor is driven for cooling operation under a certain level of temperature.

It is another object of the present invention to provide the protection of the compressor control circuits by reducing the consumption of currents at the initial drive of a compressor in accordance with the above compressor drive control method.

According to the present invention, a compressor drive control method is provided for cooling and heating dual-purpose air conditioner comprising the steps of performing stand-by control arranged so as to keep the compressor temperature above the lubricating oil freeze temperature when not in operation-on status and, at the same time, to continue discriminating the operation-on status, performing temperature comparison between the compressor temperature and the lubricating oil freeze temperature in case of selecting a heating operation by reading an operator's command under operation-on status, and referring to the above temperature comparison steps, performing the heating operation when the compressor temperature is over the lubricating oil freeze temperature and wherein stand-by control operation is done for a pre-determined time when compressor temperature is below the lubricating oil freeze temperature.

According to the present invention, there is also heating dual-purpose air conditioner which enables the compressor operation to smoothen by preventing the viscosity increases caused by the lubricating oil freeze occurring at the initial heating operation.

BRIEF DESCRIPTION OF THE DRAWINGS

For better understanding of the nature and objects of the invention, references should be made to the following detailed description taken in connection with the accompanying drawings in which:

FIG. 1 illustrates a schematic block diagram of a compressor control circuit wherein the compressor drive control method is embodied according to the principles of the present invention.

DETAILED DESCRIPTION OF THE PREFERRED EMBODIMENTS

Figure 1:
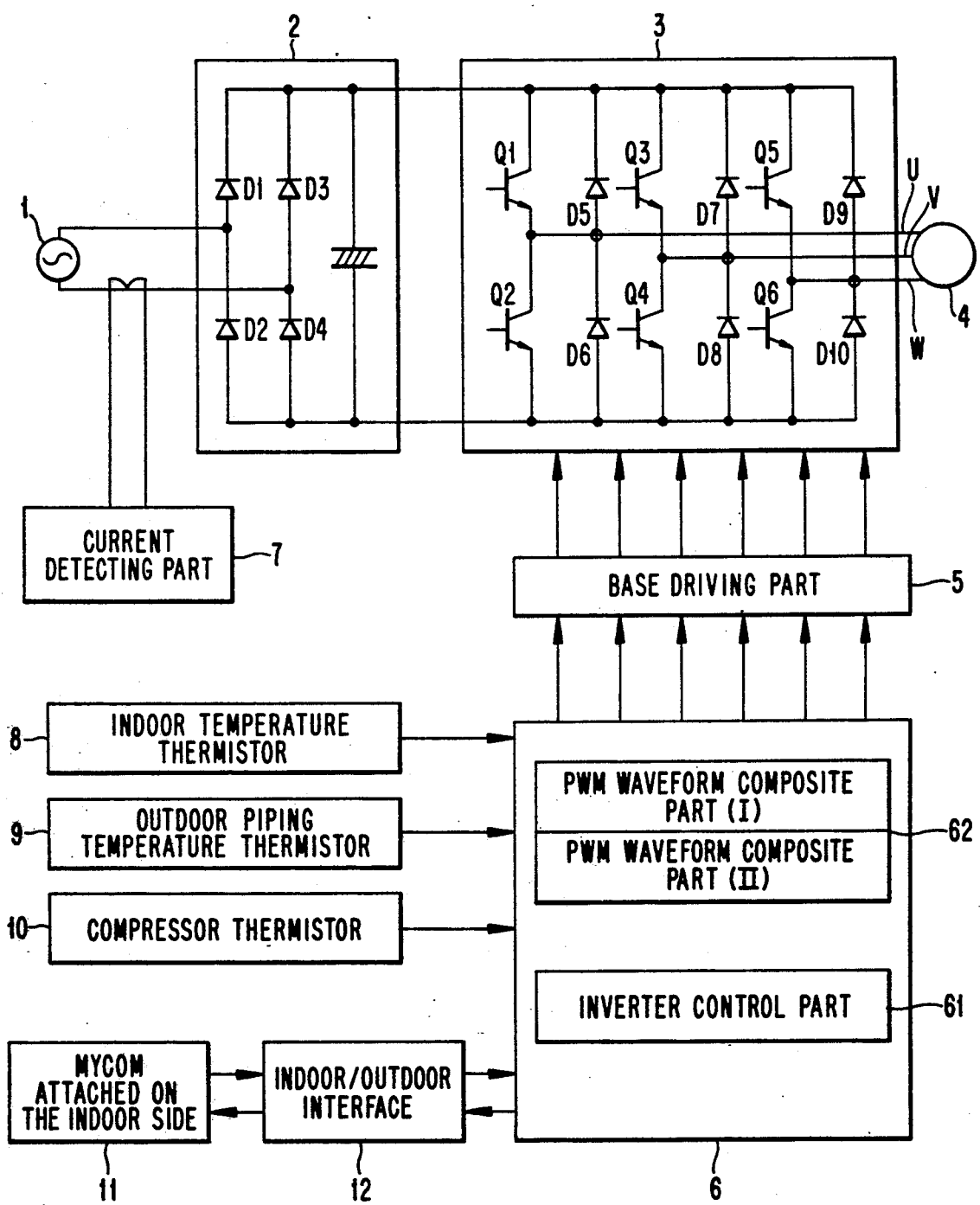
FIG. 1 is a compressor control circuit of an air conditioner for embodiment of control method according to the principles of the present invention.

The converter part 2, consisting of rectifying diodes D1-D4 and smoothing condenser C, converts the conventional alternating currents inputted from a terminal 1 to direct current.

The inverter part 3, consisting of power transistors Q1-Q6 and diodes D5-D10, converts the direct current outputted from the said converter part 2 to three-phase alternating current which is supplied to compressor motor 4 for its driving the motor.

Meanwhile, certain widths of pulses are generated from the frequencies of each current phase (U,V,W) supplied to the compressor motor 4 at the pulse width modulation (hereinafter referred to as "PWM") waveform composite part I 62 in the outdoor microcomputer 6.

The inverter control part 61 outputs signals according to the pulses generated fromthe PWM waveform composite part 62.

The base driving part 5 drives each transistor Q1–Q6 of the inverter part 3 by way of the control signals outputted from the inverter control part 61 in the outdoor microcomputer 6, by which the speed of the compressor motor 4 is controlled.

Element 7 is an input current detecting part. Elements 8, 9, 10 are thermistors installed at outdoor temperature, outdoor piping temperature and compressor respectively. Element 11 is a microcomputer at the indoor side and element 12 is an interface circuit.

Figure 2:
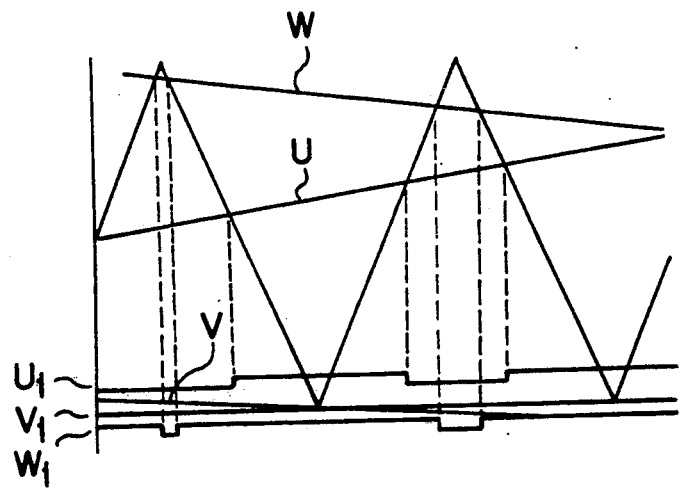
FIG. 2 is a waveform drawing that shows general pulse width modulated waveform.

FIG. 2 is a waveform drawing for pulse width modulated waveform which is a drawing for data generation used for computer simulation when the inverter part is used.

In other words, by comparing the sine-waved voltages on U, V, W phases with triangular wave voltages of carrier signals, (carrier signals come from the microcomputer) and where the voltages on U, V and W are larger in size than triangular voltages, and by turning power transistors on (U, V, W phases on the drawing), the operation can be done through sine-waved regular currents being applied to each phase of the compressor.

This is called as the pulse width modulation method and the operation of the compressor with its speed being changed can be driven by data generation that satisfies the ratio between the frequency and voltage at PWM.

Figure 3:
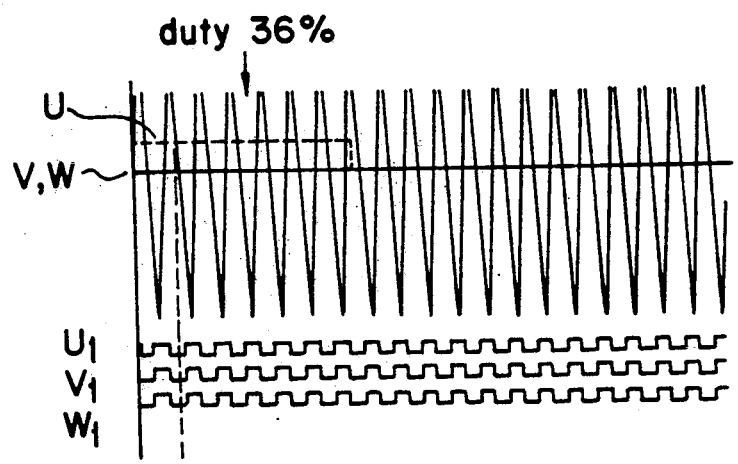
FIG. 3 shows a waveform drawing that shows pulse width modulated waveform for explanation of a control method according to the principles of the present invention.
Figure 4:
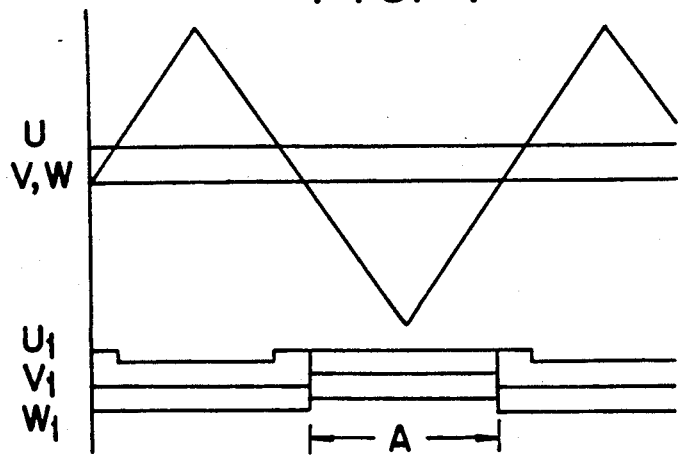
FIG. 4 is a waveform drawing of pulse width modulated waveform for up to 30° with reference to above FIG. 3.

FIG. 3 and FIG. 4 are PWM waveform drawings for explanation of a PWM data generation method in accordance with the control method of the present invention.

In the regular operation mode, PWM data is generated as shown in FIG. 2 and the compressor is operated with the speeds being changed. Meanwhile in case of a cooling operation, the compressor temperature is recognized by the compressor thermistor 10 in FIG. 1 and under a certain temperature, for instance, below 0° C. the current is applied by the control of the PWM waveform composite part 62 in microcomputer 6 under the condition that the compressor is not working. This causes the compressor temperature to increase and smooths the mix with the refrigerant of the lubricating oil.

In other words, the PWM waveform composite part I 62 controls the compressor motor 4 by conventional PWM control as in FIG. 2. Below a certain temperature, the compressor motor 4 is not driven as in FIG. 3; instead, the heating control (hereinafter referred to as "stand-by control") is performed by way of generating the heat according to the current applied to the coil.

Specifically, the outdoor side microcomputer 6 in FIG. 3 has a special duty (i.e., 36%) and generates a pulse U having a certain voltage and pulses V,W having 0 voltage, which are supplied to PWM waveform composite part II 62.

Then, the voltages on the U,V,W phases and the triangular wave of carrier voltage are compared at PWM waveform composite part II 62 and the pulses U1, V1, W1 are generated. When the pulses U1, V1, W1 are generated at PWM waveform composite part 62, the inverter control part 61 outputs the control signals by way of the pulses and inputs the control signals into the base driving part 5. The base driving part 5 controls the inverter part 3 by the control signals outputted from the above inverter control part 61.

At this moment, the inverter part 3 controlled by the base driving part 5 activates two phases simultaneously out of the three-phase U,V,W alternating currents supplied to the compressor motor 4, which generates heat by supplying currents only to the coil when the compressor motor 4 is not driven.

Thus, using this kind of stand-by control unlike the conventional compressor operation method, the compressor is heated by alternative on-off control of each set of power transistors Q1, Q3, Q5 or power transistors Q2, Q4, Q6 in an inverter 3 as in FIG. 1.

This heat effect is accomplished on sections where U phase, V phase and W phase are simultaneously activated. For instance, when the compressor is operated under the current of 5A with 100 Hz, (not necessarily 100 Hz, but the effect depends on the frequency the compressor temperature is under 20° C. below zero and if within an hour period after deactivation can be increased to over to a certain designated temperature of, e.g., 0° C.

In other words, FIG. 4 is an enlarged drawing that shows data generation status up to 30°, and the heat effect by the inductor components of a compressor motor stator is accomplished over section A where U,V,W phases are all simultaneously turned on.

Figure 5:
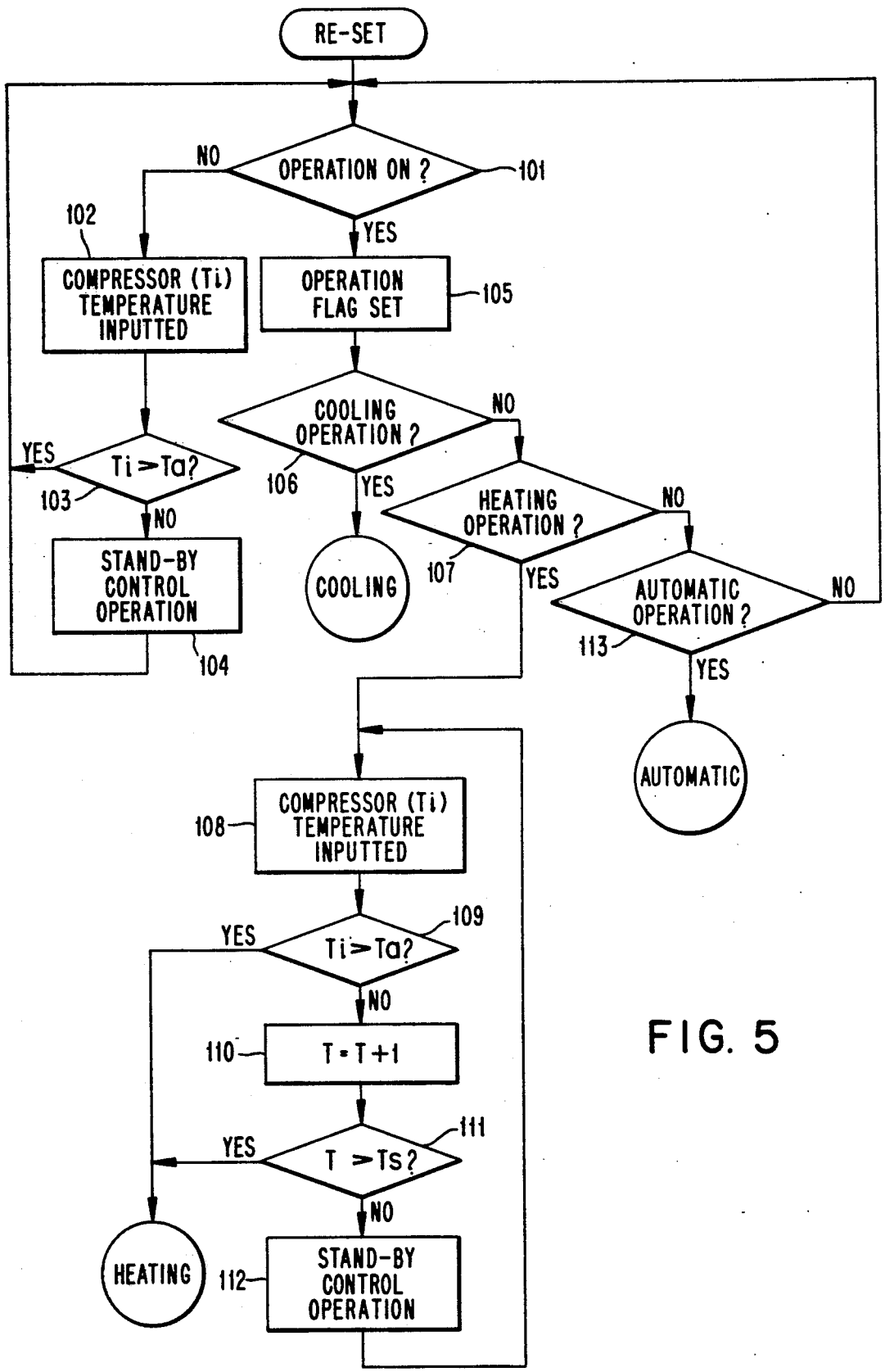
FIG. 5 illustrates a control method flow chart according to the principles of the present invention.

FIG. 5 is a flow chart for a compressor drive control method according to the principles of the present invention.

The compressor drive control method in accordance with the invention comprises the following steps.

Stand-by control is performed by which the compressor temperature is maintained above the lubricating oil freeze temperature following comparison of the compressor temperature with the lubricating oil temperature in a non-operation status;

Stand-by control is performed which keeps reading whether or not the operation status is the operation-on status;

A temperature comparison is done which compares the compressor temperature with the lubricating oil freeze temperature by reading the operator's instructions in case of operation-on status.

Operation-on stand-by control is performed wherein, in the case where the above temperature comparision stage shows that the compressor temperature is above the lubricating oil freeze temperature, the heating operation is performed and in the case where the compressor temperature is below the lubricating oil freeze temperature, the heating operation is performed following performance of stand-by control for a certain designated period.

Detailed explanation of the above is given as below in reference to the illustrated flow chart of FIG. 5.

First, the input of operation-on signal is read (step 101) to check whether or not the power supply is turned on. If the power supply is not on at step 101, the compressor temperature Ti inputted through the compressor thermistor 10 at the outdoor side microcomputer 6 is read in step 102, compared at step 103, Ti is with the predetermined lubricating oil freeze temperature Ta.

If the comparison between the inputted compressor temperature Ti and the lubricating oil freeze temperature Ta shows that inputted temperature Ti is higher than the lubrication oil freeze temperature TA(about 0° C.), steps 101 and 102 are continuously repeated at steps.

If the inputted temperature Ti is lower than or the same as the lubricating oil freeze temperature Ta, the stand-by control as shown in FIGS. 3 and 4 is performed (step 104).

If the check in step 101 shows that the status is the operation-on status, the flag operation is set in step 105 and a check is executed in step 106 as to whether the operation is a cooling operation.

If the cooling operation is found at step 106, the stand-by control in accordance with this invention is not needed because the area is considered to be a hot place. So the cooling operation is started at once. If the operation is not the cooling operation, it is checked in step 107 whether the operation is the heating operation.

If the heating operation at step 107, the compressor temperature Ti inputted from the compressor thermistor 10 located at the outdoor side microcomputer 6 is read at step 108, and it is compared with the pre-set lubricating oil freeze temperature Ta at step 109.

If the comparison between the inputted compressor temperature ti and the lubricating oil freeze temperature Ta shows that the inputted temperature Ti is higher than the temperature Ta of the lubricating oil, it is not necessary to perform the stand-by control operation of previously testing the compressor by current.

So the cooling operation is performed at once. If the input temperature Ti is lower than or the same as the lubricating oil freeze temperature Ta, the stand-by control operation is performed. However, because the stand-by control cannot be performed for too long a time, even if the temperature is below—therefor the lubricating freeze temperature an operation-on status, a time Ts is pre-set. Time T is counted at step 110 and the elapse of the pre-set time Ts is discriminated at step 111.

After the elapse of the pre-set time Ts has been detected, is (T>Ts) in step 111, if the heating operation is performed. If the pre-set time Ts has not elapsed, the stand-by control operation of step 111 is performed (step 112), and then the compressor temperature Ti is again read at step 108, and is compared with the predetermined lubricating oil freeze temperature Ta at step 109.

the repeated processes of determining the pre-set time Ts, counting the time T(step 110), and the checking in step 111 are repeatedly performed.

The check at step 107 shows that the heating operation is not taking place, checks on automatic operation are made at step 113 and if the result of the check is the automatic control being set, automatic control is performed. If the automatic control is not set, discrimination as to whether the operation-on signal is inputted is repeated at step 101.

As explained above in accordance with the principles of the present invention regarding the heat pump type cooling and heating dual-purpose air conditioner, though not in operation-on status, and under the lubricating oil freeze temperature wherein the compressor temperature increases the viscosity of the lubricating oil, two phases out of the three phases of three-phase alternating current supplied to the compressor are turned on, causing the heat to be generated inside the compressor, and the advantage that the initial drive of the compressor at the cooling operation stage can be smoothly performed is achieved.

What is claimed is:

1. A control drive method for an air conditioner comprising the steps of:
    comparing a compressor temperature with a lubricating oil freeze temperature if the air conditioner is not in an operation-on status and performing a stand-by control operation for discriminating whether an operation-on status exists, and when the compressor temperature is below the lubricating oil freeze temperature, for raising the compressor temperature above the lubricating oil freeze temperature; and
    when the air conditioner is in an operation-on status and an air conditioning operation is discriminated responsive to an operator's instructions in an operation-on status, comparing the compressor temperature with the lubricating oil freeze temperature and performing the air conditioning operation when the compressor temperature is above the lubricating oil freeze temperature and performing an operation-on stand-by control operation for raising the compressor temperature for a certain pre-set time duration if the compressor temperature is below the lubricating oil freeze temperature.

2. The method of claim 1, wherein the lubricating oil freeze temperature Ta is a temperature which increases the viscosity of the compressor lubricating oil.

3. The method of claim 1, wherein the stand-by control operation comprises:
    generating first driving pulses from at least one phase in a PWM waveform composite part by comparing one phase pulse with the triangular wave voltage, the first pulse turning on a power transistor in an inverter which is connected to the input side of one phase power-source; and
    generating at least one second driving pulse from at least one other phase in the PWM waveform composite part by comparing two phase pulses of the same phase form with the triangular wave voltage, the second pulse turning on at least one power transistor in an inverter which is connected to the output of other phases power-source; and
    wherein heat is generated by applying a resulting current to a motor stator of the compressor over the region where each transistor is turned on by the first and second driving pulses.

4. The method of claim 3, wherein the generation of heat is made by inductor components of the stator.

* * * * *